US006527103B2

(12) United States Patent
Neszmerak

(10) Patent No.: US 6,527,103 B2
(45) Date of Patent: Mar. 4, 2003

(54) CLEANING DEVICE FOR GUIDES OF ESCALATOR STEPS OR MOVING WALKWAY PLATES

(75) Inventor: Wolfgang Neszmerak, Vienna (AT)

(73) Assignee: Inventio AG, Hergiswil (CH)

( * ) Notice: Subject to any disclaimer, the term of this patent is extended or adjusted under 35 U.S.C. 154(b) by 23 days.

(21) Appl. No.: 09/821,194

(22) Filed: Mar. 29, 2001

(65) Prior Publication Data

US 2001/0025764 A1 Oct. 4, 2001

(30) Foreign Application Priority Data

Mar. 31, 2000 (EP) ........................................... 00810270

(51) Int. Cl.$^{7}$ ................................................ B65G 45/00
(52) U.S. Cl. ....................................... 198/496; 198/498
(58) Field of Search ................................ 198/496, 497, 198/498, 333, 499, 335

(56) References Cited

U.S. PATENT DOCUMENTS 4,362,232 A * 12/1982 Saito et al. ................. 198/333
4,519,490 A * 5/1985 White ........................ 198/333
4,858,745 A * 8/1989 Haas et al. ................. 198/333
5,042,641 A * 8/1991 Soldat ........................ 198/333
5,082,102 A * 1/1992 Reichmuth .................. 198/333
5,242,042 A * 9/1993 Mauldin ..................... 198/333
5,560,468 A * 10/1996 Inoue ......................... 198/333
5,671,838 A * 9/1997 Bowman .................... 198/496
5,695,040 A * 12/1997 Watanabe et al. ........... 198/333
5,746,302 A * 5/1998 Bowman ................... 15/256.5
6,405,847 B1 * 6/2002 Cook et al. ................. 198/323

OTHER PUBLICATIONS

Patent Abstracts of Japan, "Escalator With Sliding Agent Coating Function", Pub. No. 08225285, pub. Sep. 3, 1996.
Patent Abstracts of Japan, "Lubricant Coating Device For Escalators", Pub. No. 10109874, pub. Apr. 28, 1998.
Patent Abstracts of Japan, "Footstep Cleaning Device For Passenger Conveyor", Pub. No. 11171460, pub. Jun. 29, 1999.
Patent Abstracts of Japan, "Foot Step Face Cleaner For Passenger Conveyor", Pub. No. 02075596, pub. Sep. 12, 1988.

* cited by examiner

*Primary Examiner*—Christopher P. Ellis
*Assistant Examiner*—Richard Ridley
(74) *Attorney, Agent, or Firm*—Schweitzer Cornman Gross & Bondell LLP

(57) ABSTRACT

A cleaning device for guide elements in the form of slide blocks utilized in escalators and moving walkways allows contaminants in escalators and moving walkways allows contaminants, which accumulate on the escalator and moving walkway base plates, against which the slide blocks run, to be removed during escalator moving walkway operation. Cleaning slide blocks are provided at at least one of the escalator steps or moving walkway plates instead of the slide block guide elements. The cleaning blocks may be formed of a thermoplastic synthetic material with a relatively high proportion of glass fibers. The glass fibers scrape the contaminants from the base plates during escalator moving walkway motion.

8 Claims, 3 Drawing Sheets

CLEANING DEVICE FOR GUIDES OF ESCALATOR STEPS OR MOVING WALKWAY PLATES

The present invention relates to a cleaning device for guides of steps or plates of escalators or moving walkways, wherein a step belt or plate belt consisting of, respectively, interconnected escalator steps or moving walkway plates is guided between lateral borders of the escalator or moving walkway and wherein guide elements in the form of slide blocks are arranged at the escalator steps or moving walkway plates.

BACKGROUND OF THE INVENTION

Due to dirt deposits, which are caused by the environment and are virtually unavoidable, such as dust, abraded material from underground railway brakes, etc., at base plates of escalators or moving walkways or due to unfavorable material compositions, increased friction and noise output can occur between the base plates and the step belt of an escalator or a moving walkway.

To combat and avoid such friction and noise, use is often made of lubricating devices such as those set forth in, for example, Japanese Patent Specification JP 08225285. Such devices, however, entail additional production and maintenance costs.

It is therefore an object of the present invention to propose a cleaning device by means of which noise and friction can be arrested and which can be used instead of a lubricating device.

BRIEF DESCRIPTION OF THE INVENTION

The foregoing and other objects and purposes are met by the present invention in which specially constructed cleaning slide blocks are provided at least one escalator step or moving walkway plate instead of conventional slide blocks used for guidance of the step belt or plate. In a preferred embodiment the cleaning slide blocks are formed of a thermoplastic synthetic material with a relatively high proportion of glass fibers, so that dust, abraded materials and other contaminants at the lateral borders of the steps or plates are scraped off by the cleaning slide blocks during operation of the escalator or moving walkway.

In a further embodiment of the invention at least two brushes are arranged in the interior of the escalator or moving walkway in the region of the slide blocks, wherein the slide blocks are brushed and thus cleaned as they pass the brushes during movement of the step belt or plate belt. As a result of the cleaned slide blocks being cleaned, the lateral borders are also cleaned.

The invention allows the development of noise to be eliminated; through reduction in friction wear of the slide block is decreased and damage to the escalator/walkway base plates is prevented. Further advantages include the avoidance of lubricant films on the base plates and the ability to retrofit the invention upon already existing escalators and moving walkways.

BRIEF DESCRIPTION OF THE DRAWINGS

The invention is more fully explained in the following description of several embodiments, taken in conjunction with the annexed drawings. Since the objects, effects and construction of the present invention are identical for escalators and moving walkways, for the sake of simplicity only the use of the invention for escalators is described. One skilled in the art can readily understand its application to moving walkways based thereon.

DETAILED DESCRIPTION OF THE INVENTION

Figure 1:
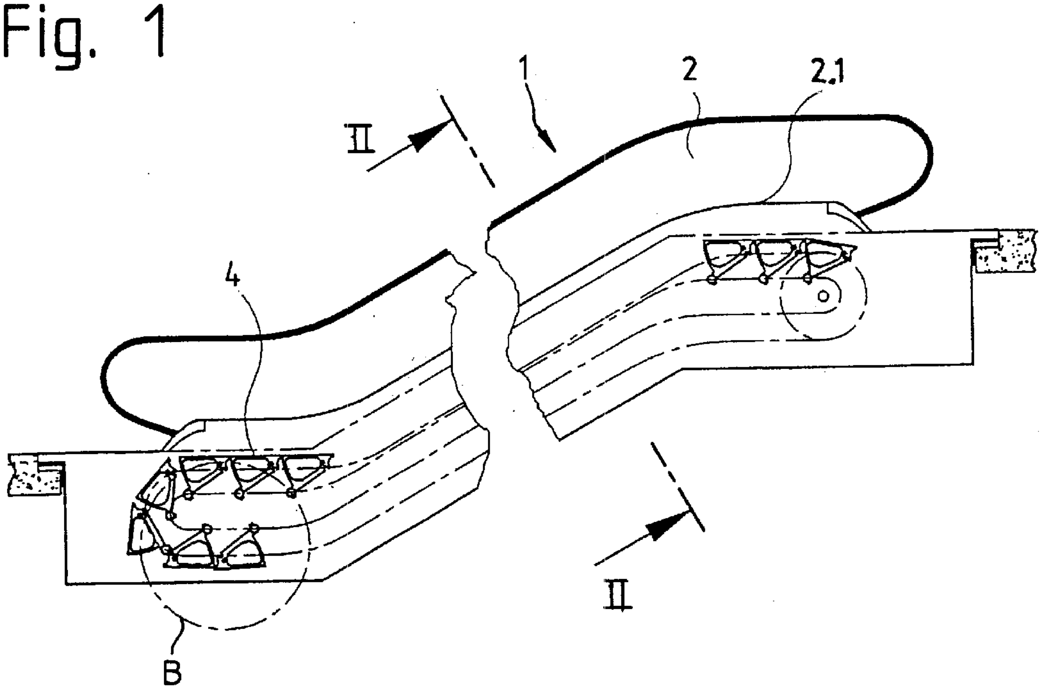
FIG. 1 is a simplified representation of a side view of an escalator incorporating the invention.
Figure 2:
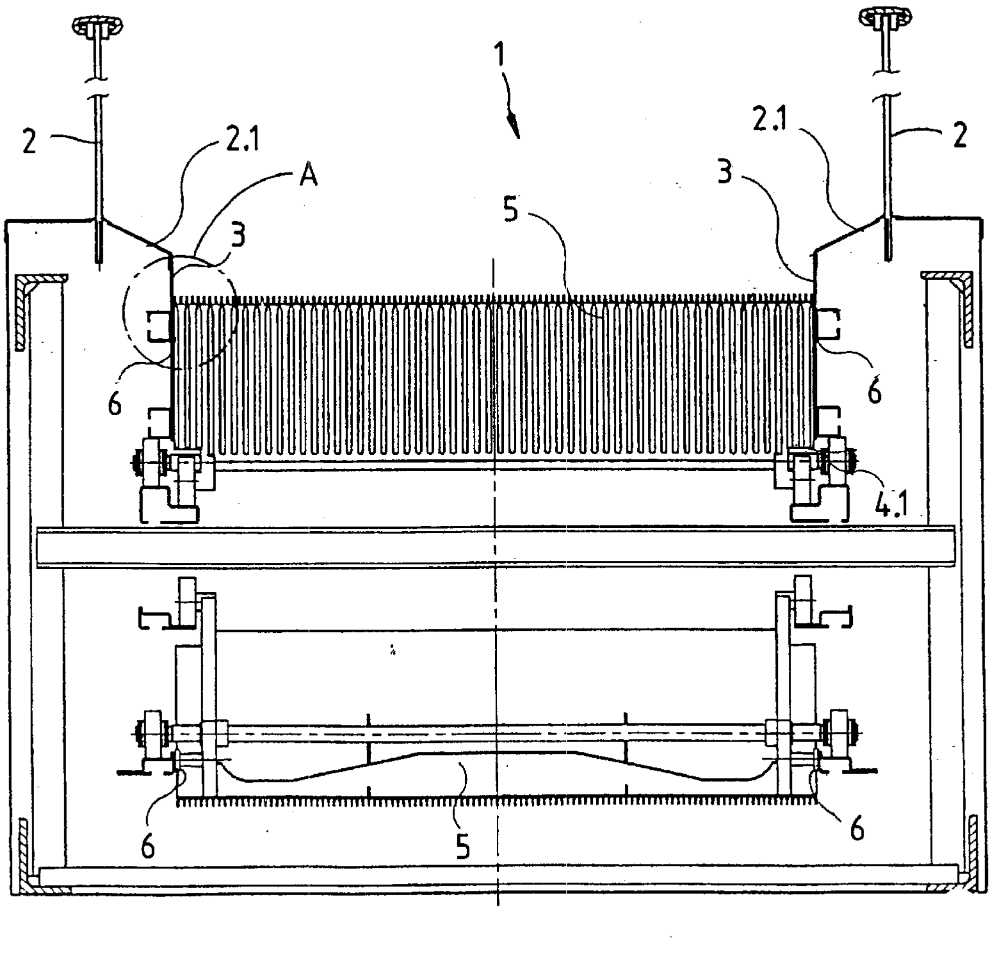
FIG. 2 is a cross-section taken along the line II—II in FIG. 1.

As seen in FIGS. 1 and 2, escalator 1 has a step belt 4, which consists of escalator steps 5 connected together by means of a transport chain 4.1. The step belt is moved and guided in the upper part of the escalator 1 between base plates 3 forming lateral borders for the step belt. The base plates 3 are parts of balustrade bases 2.1 to which a balustrade 2 is fastened. Guide elements in the form of slide blocks 6 are located at the sides of the escalator steps 5, the slide blocks projecting slightly (for example 2 millimeters) beyond the side edges of the escalator steps 5 so that the step belt 4 is guided between the base plates 3 by means of the slide blocks 6.

Figure 3:
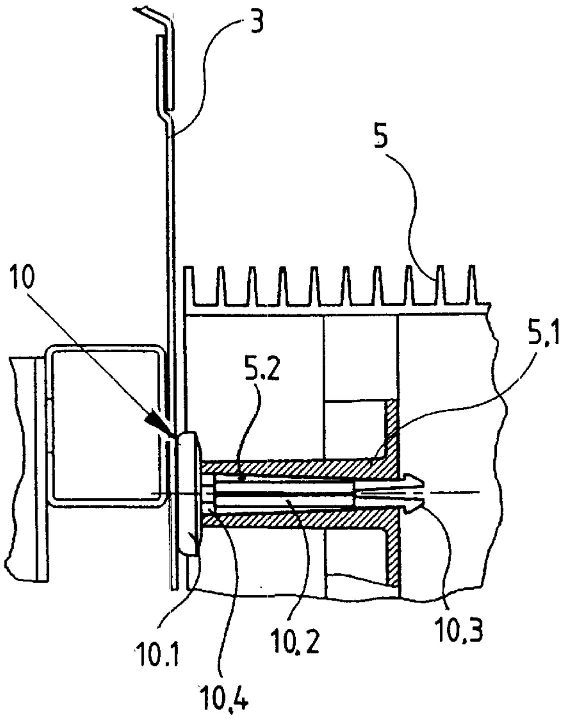
FIG. 3 is a detail view, in an enlarged scale, of portion "A" in FIG. 2, showing a cleaning slide block of the cleaning device.

Cleaning slide blocks 10 are arranged at the sides of at least one, or in case of longer escalators 1 at several, escalator steps 5 in place of the slide blocks 6 for guidance of the step belt 4. The cleaning slide blocks 10 according to FIG. 3 have the same general form as the slide blocks 6, and consist of a flange like guide part 10.1 and a shank 10.2, which has rotational securing means 10.4, such as a collar, directly behind the guide part 10.1. The rear end 10.3 of the shank 10.2 is constructed in a known manner, in such a way that the cleaning slide block 10 is retained, such as by a snap-fit, in receiving bore 5.2 of a receiving part 5.1 of the escalator step 5. The cleaning slide blocks 10 may be formed of a synthetic thermoplastic material with an approximately 15% glass fiber component, so that, during operation of the escalator, contaminations are scraped off the base plates 3, which preferably are formed of corrosion-proof stainless steel, by the glass fibers.

Figure 4A:
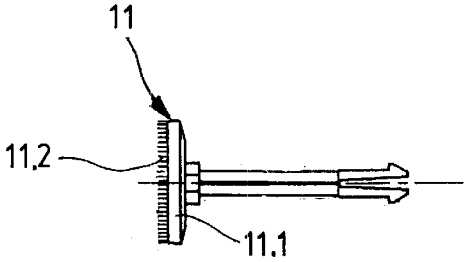
FIG. 4*a* is a side view of a second embodiment of a cleaning slide block.
Figure 4B:
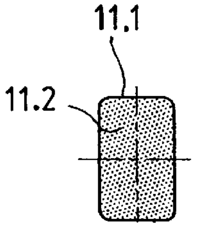
FIG. 4*b* is a front view of the cleaning slide block of FIG. 4*a;*

As depicted in FIGS. 4*a* and 4*b,* an alternative cleaning slide block 11 is constructed similarly to the cleaning slide block 10 except for a flange-like guide part 11.1. The flange like guide part 11.1 is coated on its side facing the base plate 3 with a cleaning medium 11.2, which may consist of a material with a fleece-like surface or with a brush structure, wherein the brush structure is formed from fibers extending at right angles to the surface of the guide part 11.1. The cleaning medium 11.2 can be fastened to the guide part 11.1 by, for example, gluing. It is also possible to produce the cleaning medium 11.2 by applying the fibers to the guide part 11.1 by means of electrostatic flock-coating.

Figure 5A:
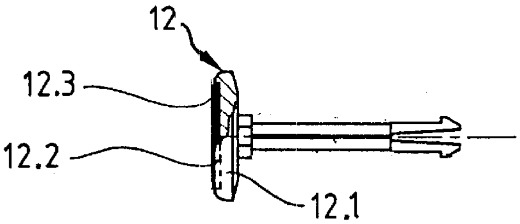
FIG. 5*a* is a side view of a third embodiment of a cleaning slide block.
Figure 5B:
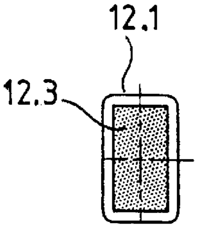
FIG. 5*b* is a front view of the cleaning slide block of FIG. 5*a;*

In FIGS. 5*a* and 5*b* a further embodiment of the cleaning slide block is denoted by 12, which comprises a flange-like guide part 12.1 in which a recess 12.2 for reception of a clearing medium 12.3 is provided. The cleaning medium 12.3 can be of the same type as the cleaning medium 11.2 described with reference to FIGS. 4*a* and 4*b*. The remaining portion of the cleaning slide block 12 corresponds to that of the cleaning slide block, 10 previously described by reference to FIG. 3.

Figure 6:
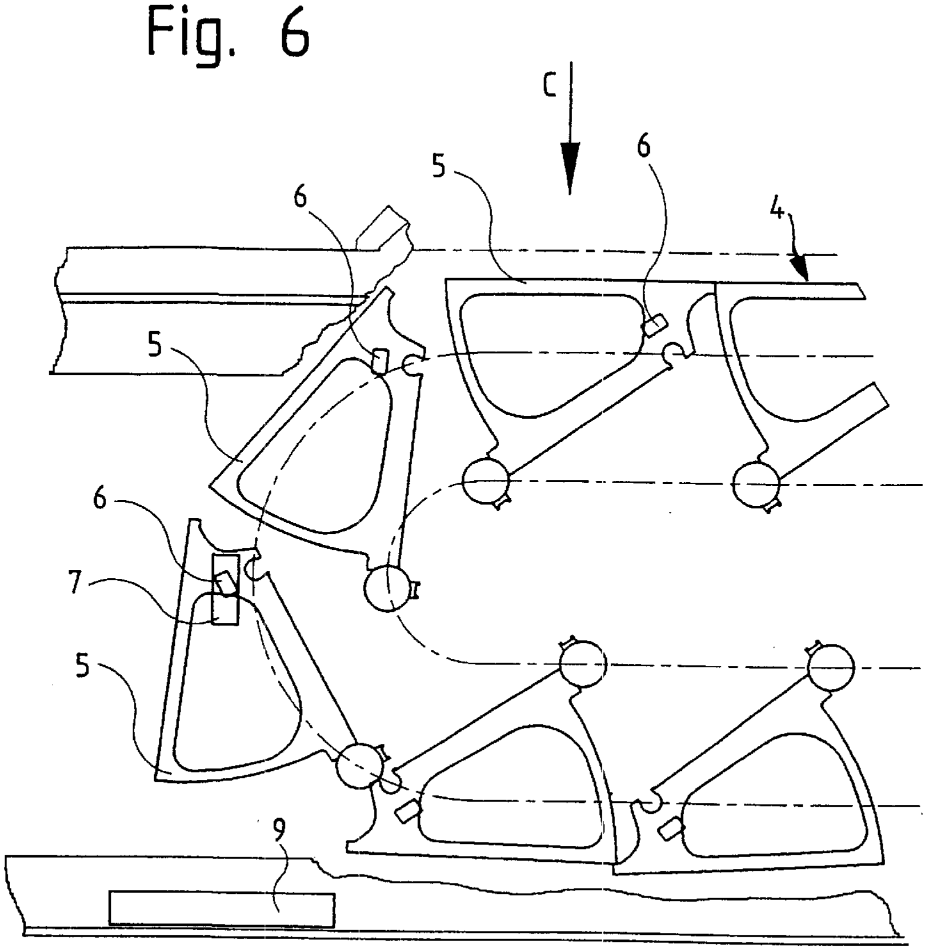
FIG. 6 is an elevation view, in an enlarged scale, of portion "B" in FIG. 1 presenting yet a further embodiment of the cleaning device.
Figure 7:
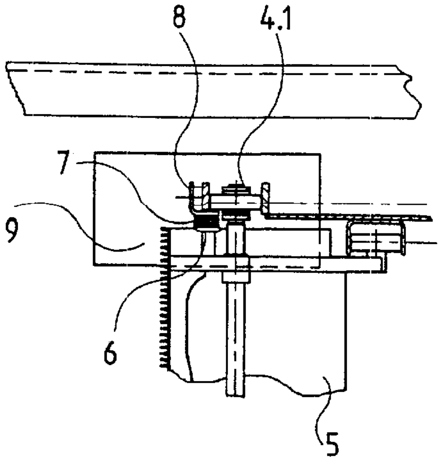
FIG. 7 is a partial plan view taken in the direction of arrow C in FIG. 6.

In the embodiment in FIGS. 6 and 7, brushes 7 are provided in the interior of the escalator 1 laterally of the step belt 4. The brushes 7, which are supported by means of holders 8, are arranged in such a manner that during escalator operation the slide blocks 6 move past the brushes and are cleaned of contamination. In order to collect the contaminants that have been stripped off, containers 9 are provided below the brushes 7. The containers can be removed and emptied as needed.

I claim:

1. A cleaning device for guides of steps or plates of escalators and moving walkways, wherein a step belt or plate belt consisting of, respectively, interconnected escalator steps or moving walkway plates is guided between lateral borders of the escalator or moving walkway and wherein guide elements in the form of slide blocks are arranged at the escalator steps or moving walkway plates, characterized in that at least one cleaning slide block for eliminating contaminations at the lateral borders is provided at at least one escalator step or moving walkway plate, the at least one cleaning block including a side facing the lateral border particularly adapted and constructed for scraping or wiping contaminants from the lateral borders.

2. A cleaning device according to claim 1, characterized in that at least the side of the cleaning slide blocks comprise a thermoplastic synthetic material with approximately 15% glass fibers.

3. A cleaning device according to claim 1, characterized in that the cleaning slide blocks have a guide part having a side facing the lateral border coated with a cleaning medium.

4. A cleaning device according to claim 3, characterized in that the guide part has a recess for reception of the cleaning medium.

5. A cleaning device according to claim 3 or 4, characterized in that the cleaning medium comprises a brush structure or a fleece-like surface.

6. A cleaning device according to claim 3 or 4, characterized in that the cleaning medium comprises fibers which are applied to the guide part by means of electrostatic flock-coating.

7. A cleaning device for guides of steps or plates of escalators or moving walkways, wherein a step belt or plate belt comprising, respectively, interconnected escalator steps or moving walkway plates is guided between lateral borders of the escalator or moving walkway and wherein guide elements in the form of slide blocks are mounted to the escalator steps or moving walkway plates, characterized in that brushes are mounted in the interior of the escalator or the moving walkway laterally of the step belt or the plate belt and in the region of the slide blocks, whereby the slide blocks are cleaned by the brushes of contaminants on movement of the step belt or the plate belt past the brushes.

8. A cleaning device according to claim 7, characterized in that demountable containers for reception of contaminants that have been stripped off are provided below the brushes.

* * * * *